No. 778,791.

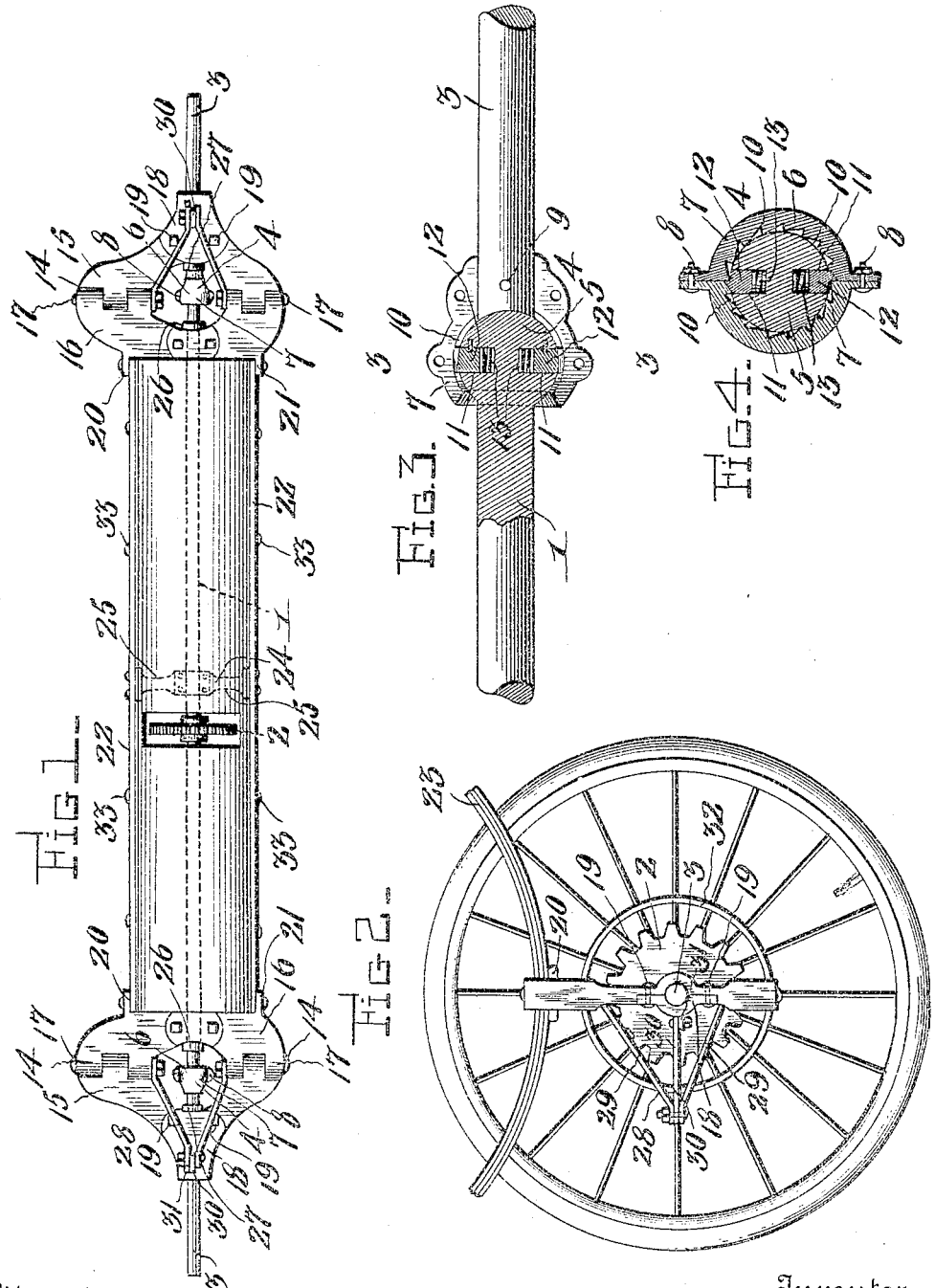

Patented December 27, 1904.

UNITED STATES PATENT OFFICE.

WILLIAM S. MORGAN, OF RUSSELL, MINNESOTA.

AXLE FOR AUTOMOBILE VEHICLES.

SPECIFICATION forming part of Letters Patent No. 778,791, dated December 27, 1904.

Application filed February 11, 1904. Serial No. 193,155.

*To all whom it may concern:*

Be it known that I, WILLIAM S. MORGAN, a citizen of the United States, residing at Russell, in the county of Lyon and State of Minnesota, have invented certain new and useful Improvements in Axles for Automobile Vehicles; and I do declare the following to be a full, clear, and exact description of the invention, such as will enable others skilled in the art to which it appertains to make and use the same.

My invention is an improved axle for automobile vehicles; and it consists in the construction, combination, and arrangement of devices hereinafter described and claimed.

The object of my invention is to provide an improved axle which may be employed either in connection with the front wheels or rear wheels of an automobile vehicle for driving the same and to enable the wheels to be swung to either side for the purpose of steering the vehicle.

In the accompanying drawings, Figure 1 is an elevation of an automobile-vehicle axle constructed in accordance with my invention. Fig. 2 is a detail end elevation of the same. Fig. 3 is a detail sectional view, on a larger scale, showing the ball-and-socket connection between the intermediate driving-section and one of the stub-shaft or spindle sections. Fig. 4 is a similar view taken on the plane indicated by the line *a a* of Fig. 3.

The driving-shaft of my improved axle comprises a central driving-section 1, to which power is applied by means of a sprocket-wheel 2 or other suitable device, and a pair of stub or spindle sections 3, each of which is connected to the section 1 by a ball-and-socket joint 4. The central section 1 is provided at its ends with spherical enlargements 5, and to the inner end of each stub-section 3 is secured a socket 6, adapted to receive one of the balls or spherical enlargements 5 and to turn thereon, so that the stub-section may be disposed angularly with reference to section 1 to enable the wheels which turn on the stub-sections to be disposed in any position required to direct the vehicle, as may be desired. Each socket 6 comprises two sections 7, which are secured together by means of bolts 8 and are secured to one of the stub-sections 3 of the shaft by means of a bolt 9. The inner faces of the sockets are provided with transverse grooves, forming ratchets 10, which are disposed in annular series.

The balls 5 of the section 1 are provided with radial recesses 11, which are circular in cross-section, and in the said recesses are radially-operated pawls 12, which are pressed outwardly by means of springs 13 and engage the ratchets in the sockets 6, so as to cause the latter, and hence the stub-sections 3, to rotate with the section 1, while enabling the said sections 3 to turn angularly with reference to the section 1 for steering purposes. Furthermore, this provision of the ratchets, sockets, and pawls enables the stub-sections 3 to revolve at different rates of speed, respectively, when the vehicle is turning. The axle proper comprises steering-knuckles and truss-rods, which connect them together, as hereinafter described. Each section 3 is also connected to the section of a steering-knuckle 14, which comprises a member 15, secured to the section 3, and a member 16, secured to the section 1, said members 15 16 being pivotally secured together by means of pivotal bolts 17, as shown. Each member 15 16 has a semicylindrical recess to fit one side of the section 1 or section 3, as the case may be, and is provided with a detachable plate 18, having a similar reversely-disposed semicylindrical recess to fit the other side of the section of the axle, and the said plates 18 are secured to the members of the steering-knuckles by means of bolts or other suitable devices 19. This provision of the members of the steering-knuckles with the removable plates enables the sections of the driving-shaft to be readily attached to or removed from said members of the steering-knuckles. The members 16 are provided, near their upper and lower ends, with laterally-extending lugs 20 21. Said lugs serve for the attachment of the truss-rods 22, which are disposed above and below the central section of the axle-shaft, the ends of the said truss-rods being attached to the said lugs by means of bolts, as shown. The upper lugs 20 also form supports for the lower sides of springs 23, with which the vehicle may be provided. The central portion of the central section 1 is journaled in a bearing 24, which has upwardly and downwardly extending arms 25, that are bolted to the truss-rods 22, as shown. It will be understood that the bearing 24, in connection with the truss-rods 22, and the steering-knuckles to which they are attached, serve to greatly strengthen the central section of the axle-shaft.

To prevent the section 1 from moving endwise in its bearings, I provide collars 26, which are secured to the said sections, which bear against the outer ends of the bearings formed by the members 16 and their plates 18. Each stub-section 3 is provided with a similar collar 27. The outer members 15 of the steering-knuckles are strengthened by means of bracket-braces 28, having arms 29, which are attached to the pivotal bolt 17 and each having an arm 30, the outer end of which is bolted to a lug 31, formed on the plate 18 of one of the members 15.

A casing 32 of cylindrical or other suitable form incloses the section 1 of the driving-shaft and is secured to the inner sides of the truss-rods 22 by means of bolts 33, as shown. It will be understood that the said casing will be provided with suitable openings for the leads of the endless sprocket-chain employed for conveying power to the sprocket-wheel 25.

It will be understood from the foregoing that my improved axle may be used either as the front axle or rear axle of an automobile vehicle for applying power either to the front or rear wheels thereof, as may be desired.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. In combination with a driving-shaft, comprising an intermediate section and end sections flexibly connected thereto for angular movement, an axle, comprising steering-knuckles forming flexible connections between the intermediate and end axle-shaft sections, and having inner and outer members provided with bearings for said axle-shaft sections respectively, said bearings including removable members to facilitate the attachment and removal of the driving-shaft sections, bolts, pivotally connecting the inner and outer members of the steering-knuckles together, trusses secured to and by said bolts and also to certain of the removable bearing members of the steering-knuckles, and connections, independent of the axle-shaft, between the inner members of the steering-knuckles, substantially as described.

2. In an axle of the class described, the combination of an intermediate driving-shaft section, an end driving-shaft section angularly movable with reference thereto, a ball on one of said sections, a substantially spherical socket on the other section to receive the ball, and pawl-and-ratchet connections between said ball and socket, for the purpose set forth, substantially as described.

In testimony whereof I have hereunto set my hand in presence of two subscribing witnesses.

WILLIAM S. MORGAN.

Witnesses:
 F. S. PURDY,
 G. H. F. THURSTON.